US010402438B2

(12) United States Patent
Drake et al.

(10) Patent No.: US 10,402,438 B2
(45) Date of Patent: Sep. 3, 2019

(54) SYSTEMS AND METHODS OF VISUALIZING MULTIMEDIA CONTENT

(71) Applicant: Disney Enterprises, Inc., Burbank, CA (US)

(72) Inventors: Edward Drake, Stevenson Ranch, CA (US); Anthony Mutalipassi, Burbank, CA (US); Andrew Wright, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 460 days.

(21) Appl. No.: 14/804,150

(22) Filed: Jul. 20, 2015

(65) Prior Publication Data

US 2017/0024385 A1  Jan. 26, 2017

(51) Int. Cl.
*G06F 16/435* (2019.01)
*G06F 16/48* (2019.01)
(Continued)

(52) U.S. Cl.
CPC ............ *G06F 16/435* (2019.01); *G06F 16/48* (2019.01); *G11B 27/322* (2013.01); *H04N 5/76* (2013.01); *H04N 9/8205* (2013.01); *G06F 17/218* (2013.01); *H04N 21/258* (2013.01); *H04N 21/25891* (2013.01); *H04N 21/45* (2013.01);
(Continued)

(58) Field of Classification Search
CPC .... H04N 21/45; H04N 21/454; H04N 21/462; H04N 21/25891; H04N 21/258; H04N 5/76; H04N 9/8205; G06F 17/30828; G06F 17/30784; G06F 17/3079; G06F 17/218; G06F 16/48; G06F 16/435; G11B 27/322
See application file for complete search history.

(56) References Cited

U.S. PATENT DOCUMENTS 7,908,556 B2  3/2011  Shamma et al.
8,239,359 B2  8/2012  Barsook et al.
(Continued)

OTHER PUBLICATIONS

Jorge et al., Exploring Movies through Interactive Visualizations, Conference Paper, Proceedings of the 27th International BCS Human Computer Interaction Conference, Sep. 13, 2013, pp. 1-6, British Computer Society, Brunel University London.
(Continued)

*Primary Examiner* — Ting Z Lee
(74) *Attorney, Agent, or Firm* — Sheppard Mullin Richter & Hampton LLP

(57) ABSTRACT

Systems and methods for creating dynamic, real-time visual representations of multimedia content. A temporal metadata visualization module receives a plurality of temporal metadata tags associated with a time code reference, representing a plurality of attributes of the multimedia content at the particular time. During playback, the temporal metadata virtualization module applies a set of display preferences and creates a visual representation of attributes identified by the temporal metadata tags at a particular time code reference. The visual representation changes based on the temporal metadata tags of a point within playback of the multimedia content, enhancing a user's experience and engagement with the multimedia content.

28 Claims, 8 Drawing Sheets

(51) Int. Cl.
    *G06F 17/30*         (2006.01)
    *G06F 17/21*         (2006.01)
    *G11B 27/32*         (2006.01)
    *H04N 5/76*          (2006.01)
    *H04N 9/82*          (2006.01)
    *H04N 21/45*        (2011.01)
    *H04N 21/454*       (2011.01)
    *H04N 21/462*       (2011.01)
    *H04N 21/258*       (2011.01)

(52) U.S. Cl.
    CPC ......... *H04N 21/454* (2013.01); *H04N 21/462* (2013.01)

(56) References Cited

U.S. PATENT DOCUMENTS

| | | |
|---|---|---|
| 8,346,540 B2 | 1/2013 | Grigsby et al. |
| 8,996,984 B2 | 3/2015 | Kissa et al. |
| 9,038,106 B2 | 5/2015 | Kritt et al. |
| 9,111,582 B2 | 8/2015 | Eseanu et al. |
| 9,113,193 B1 | 8/2015 | Gardes et al. |
| 9,167,164 B2 | 10/2015 | Baek et al. |
| 2008/0071929 A1* | 3/2008 | Motte ................ G06F 17/3089 709/246 |
| 2010/0070860 A1 | 3/2010 | Alkov et al. |
| 2010/0107117 A1 | 4/2010 | Pearce et al. |
| 2010/0229082 A1* | 9/2010 | Karmarkar ........ H04M 1/72547 715/205 |
| 2011/0029567 A1* | 2/2011 | Banda ............... G06F 17/30997 707/784 |
| 2011/0289532 A1* | 11/2011 | Yu ...................... H04N 21/4126 725/38 |
| 2012/0090009 A1 | 4/2012 | Cook et al. |
| 2013/0091431 A1 | 4/2013 | Master et al. |
| 2013/0097508 A1 | 4/2013 | Matejka et al. |
| 2013/0254816 A1* | 9/2013 | Kennedy ............. G11B 27/034 725/109 |
| 2013/0314438 A1 | 11/2013 | Borcherdt |
| 2014/0189524 A1* | 7/2014 | Murarka ................ G06Q 50/01 715/744 |

OTHER PUBLICATIONS

Ballan et al., A data-driven approach for tag refinement and localization in web videos, https://arxiv.org/pdf/1407.0623v3.pdf, May 29, 2015, pp. 1-12; accessed Aug. 1, 2016.

* cited by examiner

SYSTEMS AND METHODS OF VISUALIZING MULTIMEDIA CONTENT

TECHNICAL FIELD

The disclosed technology relates generally to content metadata, and more particularly, some embodiments relate to methods and systems of temporal visualization of content metadata.

DESCRIPTION OF THE RELATED ART

Metadata is information included within a data file that is not part of the content of the data file, but provides information about the data within the data file. For example, metadata associated with a word processor document may provide information about when the document was created, who created the document, the size of the document, and the number of pages of the document. In other words, metadata is "data about data."

BRIEF SUMMARY OF EMBODIMENTS

According to various embodiments of the disclosed technology, a more engaging user experience with multimedia content is provided. A visual representation of a plurality of attributes of the multimedia content is created and displayed to the user through a multimedia application running on a user device. The visual representation changes dynamically based on the state of the multimedia content playback, due to time code references associated with metadata tags representing the attributes. This unique use of "temporal metadata" results in a visual representation that morphs and changes as the multimedia content is played or visually searched, improving the overall experience for the user and enabling a greater connection and interaction with the multimedia content.

According to an embodiment of the disclosed technology, a method is provided for visualizing metadata of multimedia content. A temporal metadata visualization module receives a plurality of temporal metadata tags, representing a plurality of content attributes of a multimedia content being accessed by a user through a multimedia application. The temporal metadata visualization module may be included in the multimedia application, or the temporal metadata visualization module may be included at the source of the multimedia content, like a multimedia content distribution system. A visual representation of the one or more attributes associated with the plurality of temporal metadata tags is created and displayed to the user on a display of the user device. As the multimedia content is played within the multimedia application running on the user device, the temporal metadata visualization module continually updates the visual representation such that the visual representation changes dynamically to visually represent the one or more attributes associated with a current portion of the multimedia content being displayed, wherein the one or more attributes associated with a current portion of the multimedia content is determined based on the plurality of temporal metadata tags associated with a time code reference corresponding to the current portion of the multimedia content.

According to an embodiment of the disclosed technology, a system is provided for visually representing temporal metadata of multimedia content. The multimedia content includes a plurality of temporal metadata tags, where the tags represent a plurality of attributes of the multimedia content. A user device has a display and a multimedia application running thereon, where the multimedia application is configured to playback the multimedia content accessed by the user through the multimedia application. A temporal metadata visualization module—either local to the user device (i.e., part of the multimedia application) or at a multimedia content source—is configured to receive a set of display preferences, identifying the attributes to be included within a visual representation. The temporal metadata visualization module filters the plurality of temporal metadata tags and creates a visual representation of the attributes of the filtered temporal metadata tags. The temporal metadata visualization module is also configured to display the visual representation on a display of the user device, or on a separate device or screen associated with the user device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any embodiments described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
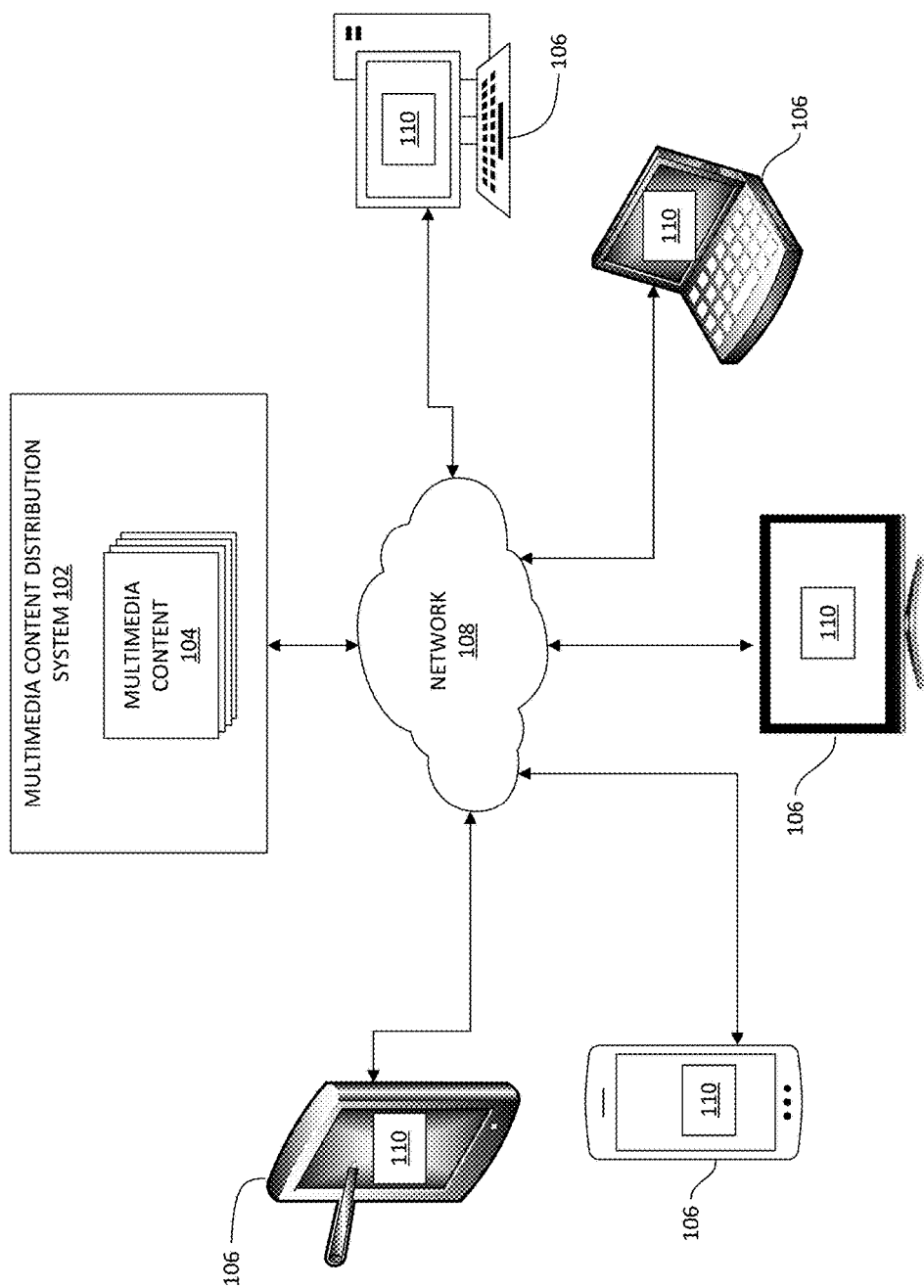
FIG. 1A illustrates an example environment in which embodiments in accordance with the technology described herein may be implemented.

The figures are not intended to be exhaustive or to limit the technology to the precise form disclosed. It should be understood that the technology described herein can be practiced with modification and alteration, and that the disclosed technology be limited only by the claims and the equivalents thereof.

DETAILED DESCRIPTION OF THE EMBODIMENTS

The use of metadata tagging for multimedia content has recently expanded beyond identifying background information regarding the multimedia content on the whole, to tagging additional information regarding the multimedia content to enable product features to be built into the multimedia content. In this way, consumers may be able to engage more fully with the content. This type of metadata may be referred to as temporal metadata. For example, a movie file may include metadata tags to describe in rich detail the content elements and attributes of each scene in the movie, or even of individual frames of the movie.

Temporal metadata may comprise a whole host of different types of descriptive information about a scene or frame, such as the characters or actors present, the type of action, the time of day, the mood, the dialogue spoken, etc. Moreover, temporal metadata includes a time code reference. The time code reference is an indicator associating the temporal metadata with a particular moment within multimedia content. In various embodiments, the time code reference is an indicator at the frame level of multimedia content. Using this time code reference, the different descriptive attributes may be identified at a particular moment in time within the multimedia content.

Temporal metadata enables consumers to engage with multimedia content to an extent not previously possible. However, current uses of the temporal metadata have failed to take full advantage of the potential benefits and enhancement-capabilities of temporal metadata. Many approaches are stuck treating the temporal metadata in a similar fashion as traditional metadata: simply identifying the metadata and identifying the tags.

Embodiments of the technology disclosed herein are directed toward systems and methods for representing temporal metadata. More particularly, the various embodiments of the technology disclosed herein relate to real-time visual representations of temporal metadata based on specified attribute filtering preferences. As multimedia content is played, a temporal metadata visualization module dynamically changes a visual representation of temporal metadata based on the time code reference associated with temporal metadata at that specific time within the multimedia content. In this way, the temporal metadata is uniquely provided to the user, increasing the user's engagement with the content as the user can perceive changes in attributes during playback of the multimedia content. By providing an attribute filtering interface, various embodiments of the technology of the present disclosure enable users to identify the type of attributes that the user wants to view within the visual representation, allowing for tailored visualizations.

Before describing in detail the technology of the present disclosure, it may be helpful to describe an example environment in which embodiments of the technology may be implemented. FIG. 1A shows an example environment in which embodiments of the technology disclosed herein may be implemented. The example environment of FIG. 1A is an example networked environment. Multimedia content distribution system 102 may comprise one or more content servers operated by a multimedia content provider in various embodiments. Multimedia content distribution system 102 stores one or more multimedia content 104 that may be distributed to a plurality of user devices 106 over a network 108. Non-limiting examples of multimedia content 104 include: movies; television shows; songs or complete music albums; or audiobooks. Although the technology of the present disclosure is discussed with respect to movie playback, embodiments of the technology are applicable to the types of multimedia content identified above, as well as other digital multimedia content to which metadata tags may be associated.

The type of network 108 may vary, depending on the protocol(s) available to the user devices 106 at a given time. Some non-limiting examples of protocols over which the user devices 106 may connect to the network 108 include: cellular telecommunications protocols, such as GSM, UMTS, CDMA2000, LTE, or WiMAX; wired communication methods, such as cable, DSL, dial-up, or fiber-optic; or wireless communication methods, such as satellite communications, Wi-Fi, Bluetooth, or near-field communication (NFC). The user devices 106 may be able to utilize more than one type of protocol to connect with the network 108 in some embodiments.

User devices 106 may be any number of computing devices, having a memory and processor. Non-limiting examples of user devices 106 are: desktop computers; laptops; tablets; cell phones; smart phones; wearable technology, such as smart watches; PDAs; televisions; or other user devices. A multimedia application 110 running on the user devices 106 enables users to communicate with the multimedia content distribution system 102 through the network 108. The multimedia application 110 may be an application downloaded to the user devices 106 and stored in memory. In some embodiments, the multimedia application 110 may be operating within another program running on a user device 106, such as a web browser.

Having described an example environment in which the disclosed technology can be implemented, various features and embodiments of the disclosed technology are now described in further detail. After reading the description herein, it will become apparent to one of ordinary skill in the art that the disclosed technology can be implemented in any of a number of different environments operating with any of a number of different user devices 106.

Embodiments of the technology disclosed herein provide systems and methods for visually representing temporal metadata of multimedia content during playback and various modes of visual search. The multimedia content may be accessed through a multimedia application running on a user device (or a peripheral device connected to the user device). The multimedia application may be designed to receive multimedia content from a source. For example, the multimedia application may be running on a user device communicatively coupled to a multimedia content distribution system, similar to the one discussed with respect to FIG. 1A. The multimedia content 104 may be streamed to the user device 106 through the multimedia application 110 from the multimedia content distribution system 102. Other embodiments may have the multimedia content 104 downloaded to the user device 106 from the multimedia content distribution system 102 or from storage devices associated with the user, such as an external hard drive or multimedia server for example, using the multimedia application 110 running on the user device 106. Various embodiments may have the multimedia content 104 loaded onto the user device 106 via a multimedia medium. Some non-limiting examples of multimedia mediums include: compact discs (CDs); Bluray discs; USB drives; secure digital (SD) cards; universal serial bus (USB) drives; or other multimedia medium.

To increase engagement by the users with the multimedia content, a temporal metadata visualization module provides a dynamic visual representation of temporal metadata tags of the multimedia content. As discussed above, temporal metadata tags may be included in the multimedia content, identifying specific "attributes" of the multimedia content associated with a time code reference. The temporal metadata visualization module may receive the temporal metadata tags identifying various attributes of the multimedia content and create visual representations of the attributes in real-time, i.e., in sync with the particular period within the multimedia content. That is, a visual representation of various attributes may be displayed in combination with playback of the multimedia content by the multimedia application.

Figure 1B:
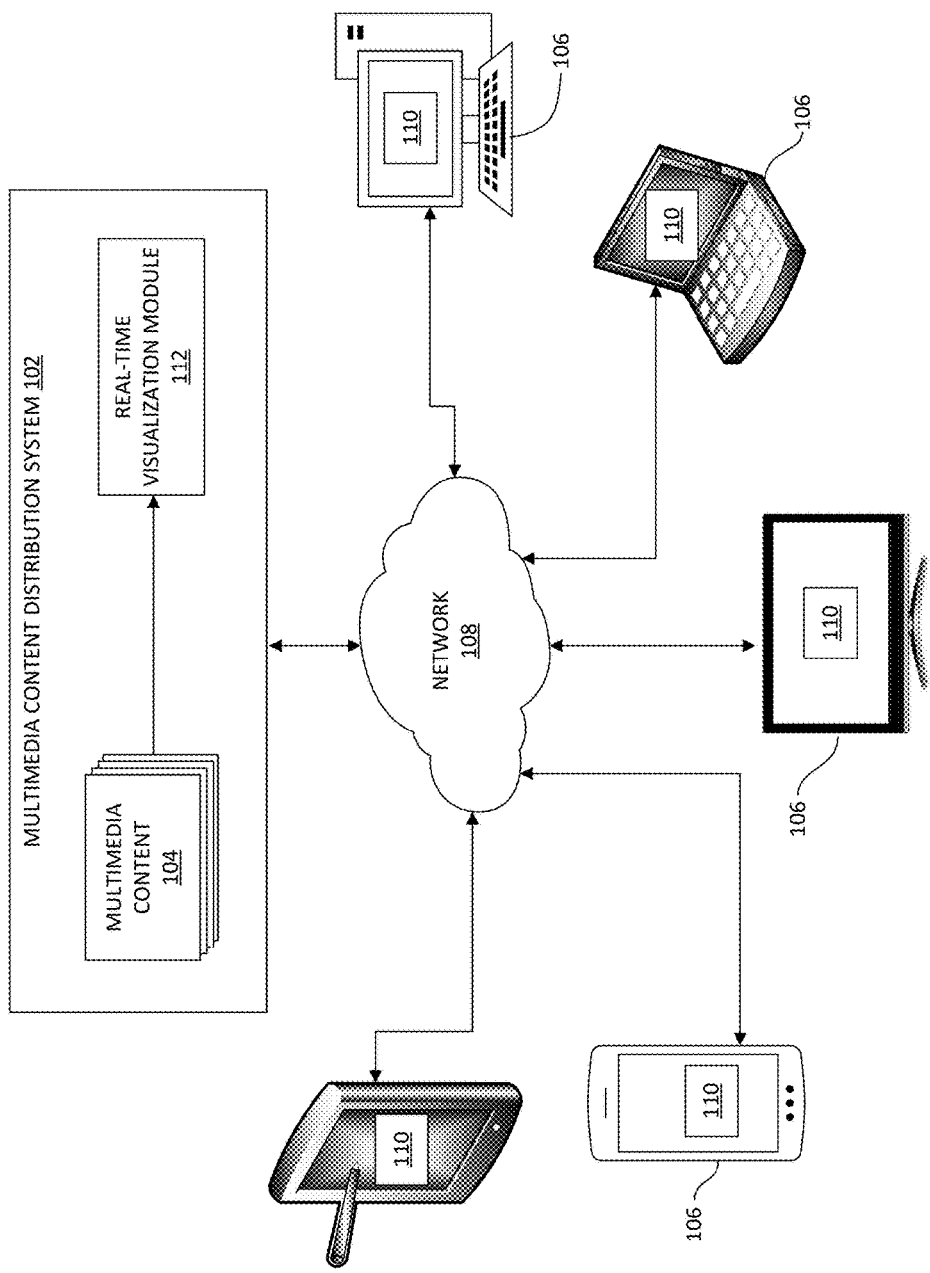
FIG. 1B illustrates an example embodiment showing implementation of a temporal metadata visualization module within a multimedia content distribution system, in accordance with embodiments of the technology described herein.

FIG. 1B illustrates an example environment implementing an example embodiment of the temporal metadata visualization system in accordance with the technology of the present disclosure. The example embodiment is implemented in a networked environment, similar to the environment discussed above with respect to FIG. 1A. As shown in FIG. 1B, a temporal metadata visualization module 112 is included within the multimedia content distribution system 102. When a user seeks to access a multimedia content 104 using a multimedia application 110 running on a user device 106, the multimedia content distribution system 102 may stream the multimedia content to the user device 106. In addition, as the multimedia content is streamed to the user device, the temporal metadata tags identifying attributes associated with a time code reference may be received by the temporal metadata visualization module 112 for creation of a visual representation of the identified attributes. The visual representation created by the temporal metadata visualization module 112 may be streamed to the user device 106 simultaneously with the accessed multimedia content 104. In some embodiments, the multimedia content distribution system 102 may parse the temporal metadata tags from the multimedia content 104 such that the temporal metadata visualization module 112 receives the temporal metadata tags and associated time code references for processing.

In other embodiments, the temporal metadata visualization module 112 may receive the multimedia content 104 and parse the temporal metadata tags itself, before the multimedia content 104 is streamed to the user device 106. The multimedia content 104 may include a content portion and a metadata tag portion. The temporal metadata visualization module 112 may receive the multimedia content 104 and identify the metadata tag portion of the multimedia content 104, wherein the metadata tag portion contains the plurality of temporal metadata tags representing attributes of the multimedia content 104 at specific time code references.

Although discussed with respect to the example embodiment of FIG. 1B, the temporal metadata visualization module 112 may be located outside of the multimedia content distribution system 102. For example, some embodiments may have the temporal metadata visualization module 112 as part of the multimedia application 110 running on each user device 106. In such embodiments, the temporal metadata visualization module 112 may be a plug-in to a web browser that has accessed a web-based multimedia application, or the temporal metadata visualization module 112 may be part of a multimedia application 110 downloaded and run directly on a user device 106 (e.g., smart phone apps).

Figure 2:
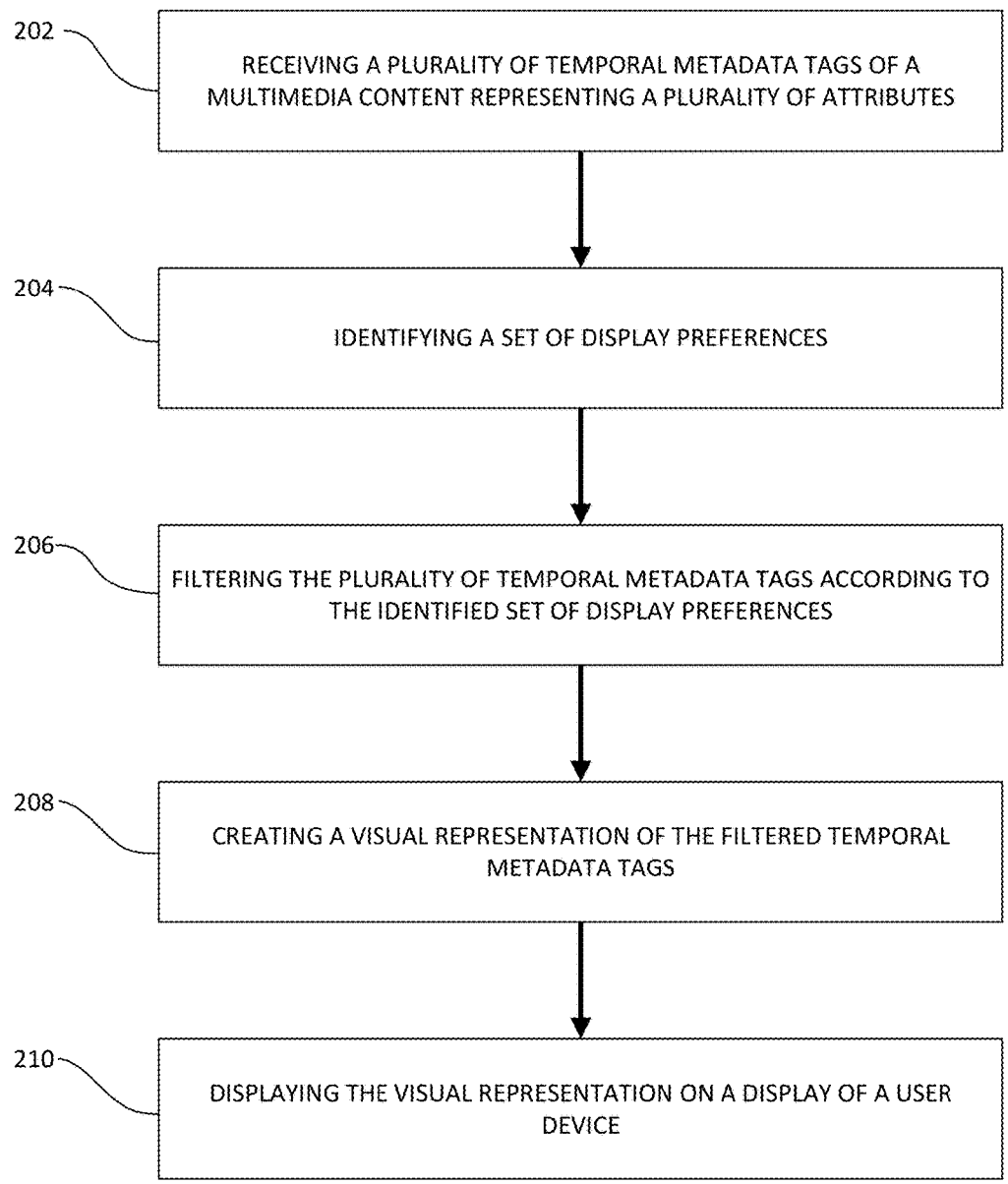
FIG. 2 is a flow diagram illustrating an example temporal metadata tags visualization process of an example temporal metadata visualization module in accordance with the technology described herein.

FIG. 2 is a flow diagram illustrating an example process of embodiments of the temporal metadata visualization module in accordance with the technology of the present disclosure. At 202, the temporal metadata visualization module receives a plurality of temporal metadata tags of a multimedia content. As discussed above with respect to FIG. 1B, the temporal metadata visualization module may receive only the temporal metadata tags, or it may receive the multimedia content and parse the temporal metadata tags.

At 204, the temporal metadata visualization module identifies a set of display preferences. The set of display preferences identify the types of attributes to be included in the visual representation, filtering out the temporal metadata tags of other attributes prior to creating the visual representation at 208. In some embodiments, the set of display preferences may be hard coded, meaning that the set of display preferences may be set by the content owner, multimedia application creator, or other person with control over the multimedia content and its distribution. The hard coded set of display preferences may vary, in some embodiments, based on a group category of the user, i.e., a membership level to which the user belongs. That is, a higher group category may have access to a greater number of attributes of the multimedia content.

More customization in the visual representation may result in greater customer engagement with the multimedia content. Accordingly, various embodiments may provide the users with the ability to define the set of display preferences. In such embodiments, identifying the set of display preferences at 204 may include receiving a set of display preferences from a user via an attribute filtering interface of the multimedia application, such as multimedia application 110 illustrated in FIGS. 1A and 1B. In such cases, the user may determine which attributes are of interest and desire to see a visual representation of only those attributes. In some embodiments, the available set of attributes that are available to the user may be limited based on the group category to which the member belongs, as discussed above.

Once the applicable set of display preferences are identified, the temporal metadata visualization module filters the plurality of temporal metadata tags according to the set of display preferences at 206. The temporal metadata visualization module uses the set of display preferences to identify the temporal metadata tags representing the applicable attributes and ignores those temporal metadata tags representing those attributes that are not to be included in the visual representation.

At 208, the temporal metadata visualization module creates a visual representation of the filtered temporal metadata tags. The visual representation may take on several different forms. Non-limiting examples of components of the visual representation include: a visual tag cloud; a text tag cloud; a related-text display area; a mixed visual indicator-textual tag cloud; or a combination thereof. The example components of the visual representation will be described in detail with respect to FIG. 4.

Once the visual representation is created, the temporal metadata visualization module displays the visual representation on a display of the user device at 210. In some embodiments, the visual representation may be displayed simultaneously with playback of the multimedia content by the multimedia application running on the user device. In other embodiments, a user activates or enables a temporal metadata visualization mode of the multimedia application to display the visual representation. In such embodiments, the temporal metadata visualization mode may be initiated at a set playback time of the multimedia content (e.g., a visualization mode is automatically initiated after the title cards of a movie).

A user may initiate the temporal metadata visualization mode in various embodiments. As will be described below with respect to FIGS. 3 and 4, a visualization mode button may be provided within the multimedia application to enable the user to initiate the temporal metadata visualization mode. Where applicable, the user may be able to initiate the temporal metadata visualization mode using swipe gestures on touch screen user devices.

As discussed above, the multimedia content may be downloaded to the user device in some embodiments, instead of being streamed from the multimedia content distribution system. In such embodiments, the visual representation created by the example process of FIG. 2 may be completed prior to the multimedia content being downloaded onto the user device. Where applicable, the temporal metadata visualization module may create the visual representation over the entire length of the multimedia content a priori, and send that visual representation to the user device along with the multimedia content.

In one configuration, the example process of FIG. 2 is not a static process, but continuously being performed. As discussed above, the temporal metadata tags are metadata tags associated with a particular time code reference. In this way, the metadata tag indicates that an attribute is present in the multimedia content during that time frame, but it is not an indication that the attribute of the metadata tag is always present. As the multimedia content is played back, the temporal metadata visualization module is constantly receiving temporal metadata tags. Therefore, the temporal metadata visualization module is constantly updating and creating a new visual representation of the temporal metadata tags based on the specific time of playback. In this way, the visual representation is constantly changing, indicating the change occurring within the multimedia itself. The example process of FIG. 2 may be a continuous process, with the temporal metadata visualization module constantly receiving and processing temporal metadata tags.

Figure 3:
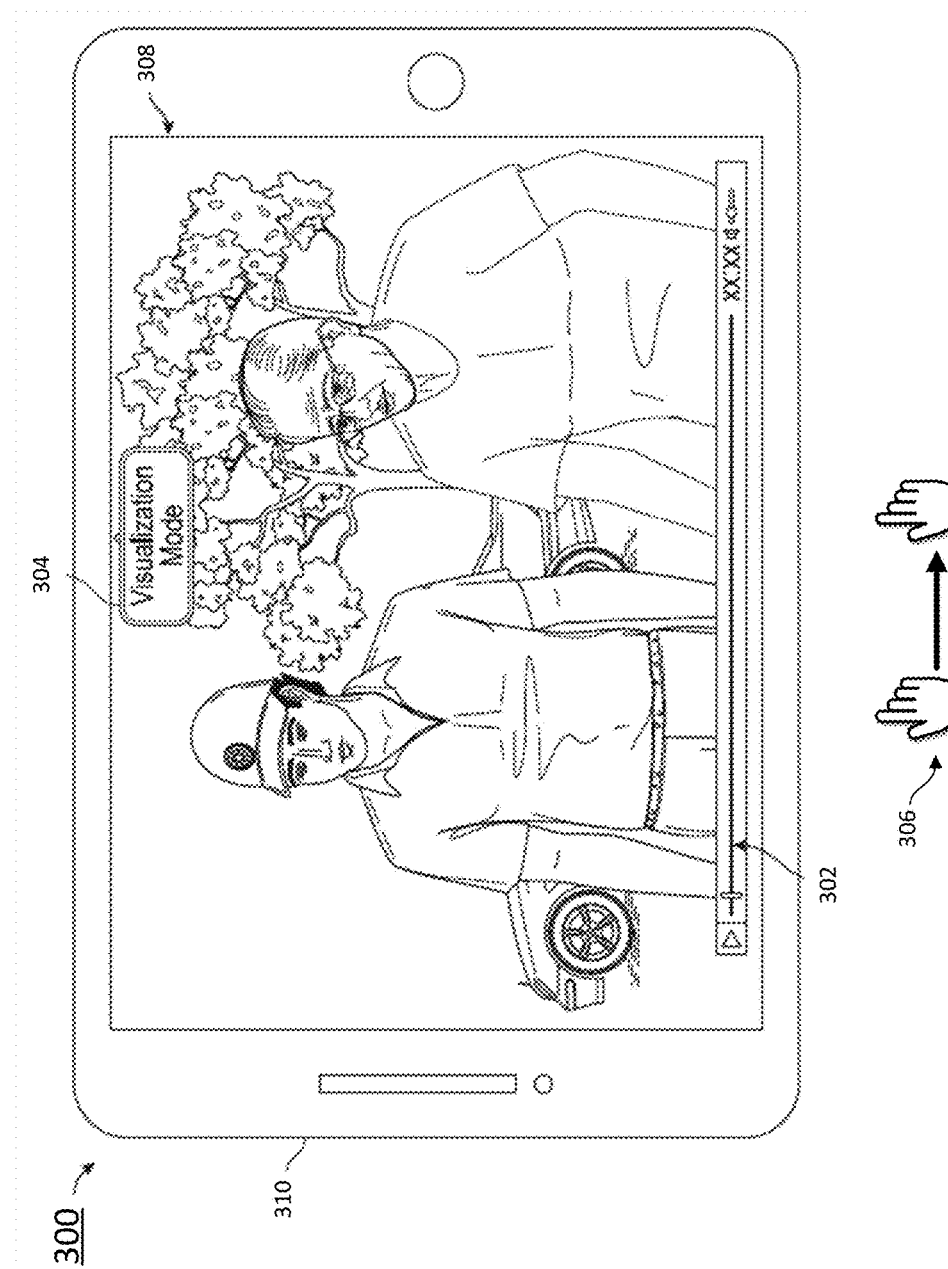
FIG. 3 illustrates an example user interface of a multimedia application running on a user device in accordance with embodiments of the technology described herein.

FIG. 3 illustrates an example user interface 300 of the multimedia application in accordance with embodiments of the present disclosure. For ease of illustration, FIG. 3 and the other figures and description to follow shall be described in view of a movie representing the multimedia content. Although described in such a manner, the present disclosure should not be read to limit the scope of the technology only to such embodiments.

As illustrated in FIG. 3, the user interface 300 may include a multimedia content scrubber control 302 and a visualization mode button 304. The multimedia content scrubber control 302 may be a traditional multimedia content scrubber 302, indicating to the user of the amount of time elapsed during playback, and enabling a user to navigate through multimedia content to a particular time. The multimedia content scrubber control 302 may include a slide bar for volume control in some embodiments. Various embodiments may include a button for increasing the size of the displayed portion of the multimedia content. Such embodiments enable multimedia content formatted for a screen of a particular size to be properly matched with the available viewing area of the user device.

The visualization mode button 304 is a way of initiating the temporal metadata visualization mode. Some embodiments may have a separate visualization mode button 304 disposed on an edge of the display 308 of the user device 310. The visualization mode button 304 may be implemented in different ways in different embodiments. As illustrated in FIG. 3, the visualization mode button 304 may be a push button that a user may click on to initiate the temporal metadata visualization mode. In some embodiments, the visualization mode button 304 may be included in the multimedia content scrubber control 302, similar to the inclusion of the volume control. A drop down menu may be included in various embodiments in accordance with the technology, represented by an icon disposed within the display 308, which includes the visualization mode button 304.

In some embodiments, the temporal metadata visualization mode may be initiated without the need to activate a visualization mode button 304. Where the user device 310 comprises a touch screen interface, the temporal metadata visualization mode may be initiated through a swipe gesture, such as the swipe gesture 306 illustrated in FIG. 3. The swipe gesture 306 may be from left to right, as depicted in FIG. 3, or it may be from right to left, bottom to top, or top to bottom, in various embodiments. In some touch screen-based devices, the user interface 300 may allow initiation of the temporal metadata visualization mode by either using a visualization mode button 304 or a swipe gesture 306. Where the user device includes a microphone or other acoustic transducer, the temporal metadata visualization mode may be initiated by the user through voice commands. For example, a user may say "Start visualization," and the multimedia application on the user device 310 may initiate the temporal metadata visualization mode without physical interaction by the user. Voice recognition may be utilized to initiate and deactivate the temporal metadata visualization mode, as well as conduct other navigation within the multimedia application. Using the visualization mode button 304, swipe gesture 306, or voice recognition enables the user to toggle between the temporal metadata visualization mode and a playback mode, wherein the playback mode is a standard mode in which the multimedia application simply plays the multimedia content.

Figure 4:
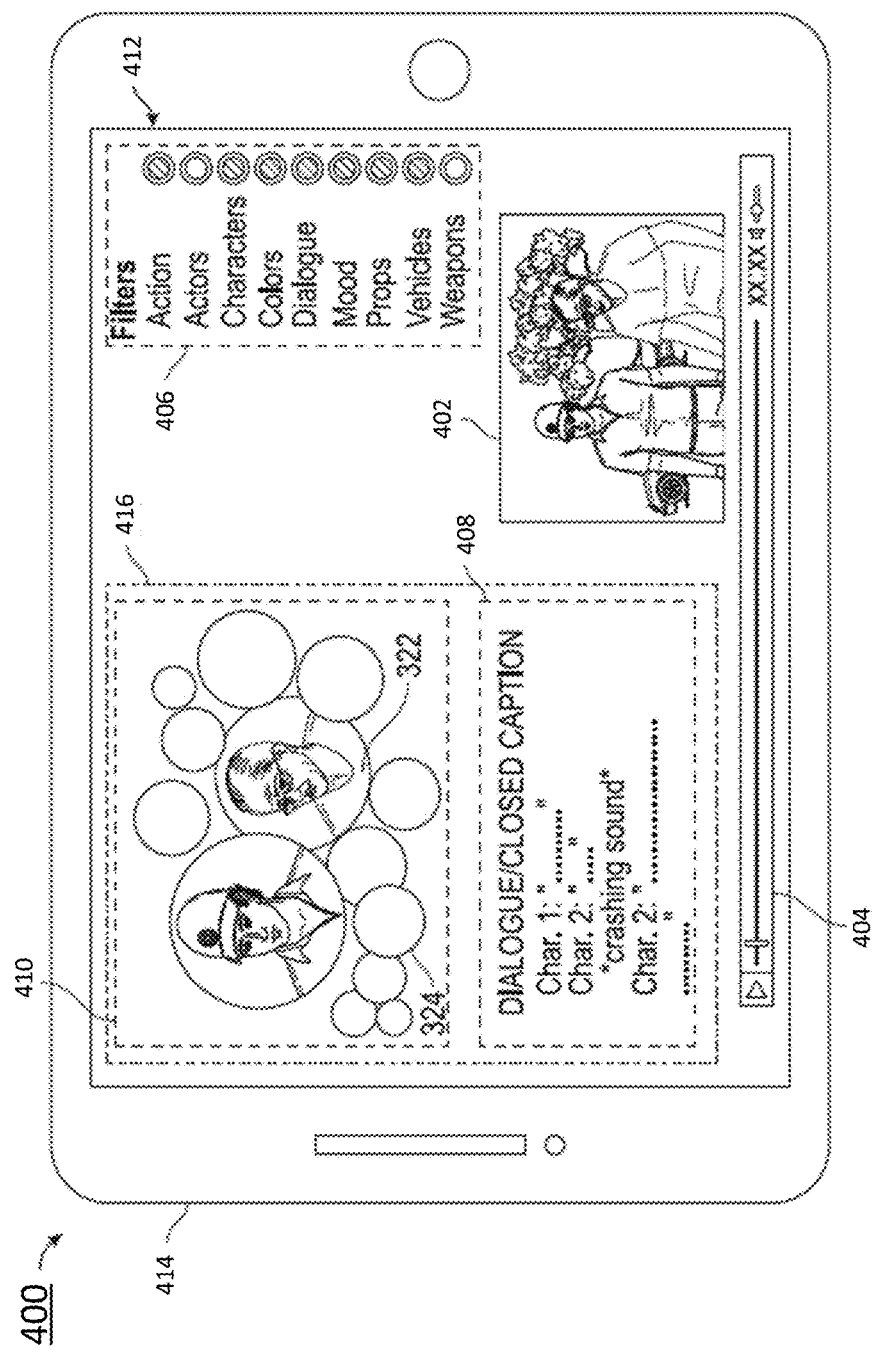
FIG. 4 illustrates an example visualization mode interface of a multimedia application running on a user device in accordance with embodiments of the technology described herein.

FIG. 4 illustrates an example visualization mode interface 400 of a multimedia application in accordance with embodiments of the technology disclosed herein. In various embodiments, the visualization mode interface 400 may be the default interface of the multimedia application running on the user device 414. In such embodiments, the visualization mode interface 400 may be active when the multimedia application begins. Where the multimedia application includes multiple modes (i.e., a temporal metadata visualization mode and a playback mode), the visualization mode interface 400 may be visible by initiating the temporal metadata visualization mode via a visualization mode button, such as the visualization mode button 304 of FIG. 3, by a swipe gesture on a user device 414 with a touch screen interface, such as the swipe gesture 306 of FIG. 3, or through voice recognition where the user device 414 includes an acoustic transducer.

The visualization mode interface 400 comprises a multimedia content display area 402, an attribute filtering interface 406, and a visual representation 416 of the temporal metadata tags, in various embodiments. The multimedia content display area 402 provides playback of the multimedia content. Although shown in FIG. 4 as being disposed in the lower right corner of the display 412 of the user device 414, the multimedia content display area 402 may be located anywhere within the visualization mode interface 400 in various embodiments. The visualization mode interface 300 may further include a multimedia content scrubber control 404, similar to the multimedia content scrubber control 302 of the user interface 300 of FIG. 3. A user can utilize the multimedia content scrubber control 404 to advance or reverse the multimedia content, thereby changing the specific period of the multimedia content that is being played-back by the multimedia application of the user device 414.

As discussed above, current systems utilizing temporal metadata leverage existing methods of displaying and using such information, which were designed more for non-temporal metadata that remains the same for the length of a given multimedia content. A visual representation 416 in accordance with embodiments of the technology of the present disclosure provides a unique and highly engaging visual depiction of the temporal metadata tags associated with the multimedia content. As illustrated in FIG. 4, the visual representation 416 may include a related-text display area 408 and a tag cloud area 410. The related-text display area 408 may display related textual information concerning a particular scene or frame at a given time code reference. For example, in the illustrated example the multimedia content is a movie. The related-textual display area 408 may display the dialogue spoken by the actors within the currently playing scene, in real time. The related-textual display area 408 may provide other types of textual information related to the currently playing scene, such as: script notes; behind the scenes stories; director's notes; trivia facts; or other textual information that is identified by a category of temporal metadata tags. In some embodiments, the related-textual display area 408 may be utilized to provide closed-captioning services.

In various embodiments, the tag cloud area 410 may present different types of visual depictions of the temporal metadata, which change dynamically based on the time code references associated with the temporal metadata tags. In the illustrated embodiment of FIG. 4, the tag cloud area 410 comprises a visual tag cloud, wherein different categories identified based on the temporal metadata tags of the multimedia content are represented by visual indicators. In other embodiments, the tag cloud area 410 may comprise a textual tag cloud. The tag cloud area 410 may comprise a mixed indicator-textual tag cloud in still other embodiments. The mixed indicator-textual tag cloud may include visual indicators, similar to the visual indicators displayed in the visual tag cloud of tag cloud area 410 of FIG. 4, as well as textual tags as seen in a textual tag cloud. In this way, the tag cloud area 410 may provide a depiction of attributes that are not easily attributable to a particularly useful visual depiction.

The tag cloud area 410 may further enable the user to obtain greater information regarding the attributes of the multimedia content represented. For example, a user could click on a visual indicator 422 included in the tag cloud area 410 and access additional information about the attribute represented by that visual indicator 422. Some embodiments may also include a hyperlink to more information about the attribute located on the Internet.

Although the visual representation 416 is described with respect to a related-text display area 408 and a tag cloud area 410, other embodiments of the technology of the present disclosure may include greater or fewer different visual depictions. For example, some embodiments may include two tag cloud areas 410, one showing a visual tag cloud, like the one shown in FIG. 4, and the second tag cloud area may show a textual tag cloud. Moreover, other embodiments of the visual representation 416 may include only the tag cloud area 410.

As the time code references continue to change during playback of the multimedia content, the information within the visual representation 416 may change dynamically to represent the new temporal metadata tags. For example, back to the movie example, the visual indicators of the visual tag cloud shown in the tag cloud area 410 of FIG. 4 may change size, shape, and/or location, to reflect changes in the importance or presence of one or more categories of temporal metadata tags at the given time code reference. As illustrated in FIG. 3, visual indicator 422 is displayed as being larger than visual indicator 424. Based on this, one may identify that the category of metadata tags identified by visual indicator 422 has greater importance at the particular time code reference of the playback of the multimedia content than the category identified by visual indicator 424. In addition, where a related-text display area 408 is included in the embodiment of the visual representation 416 implemented, the text displayed in the related-text display area may change in a similar fashion, scrolling through the related text based on the time code reference.

As the temporal metadata is being visualized based on the time code references associated with the temporal metadata tags, the visualization is capable of changing in sync with the particular speed with which the multimedia content is being played back by the multimedia application. For instance, if the user was to utilize the multimedia content scrubber control 404 to advance the multimedia content faster than normal playback speed, the visual representation 406 will change at the same speed with which the user advances the multimedia content using the multimedia content scrubber control 404. This unique visual representation takes greater advantage of the temporal-nature of the temporal metadata tags than traditional approaches that were designed for static metadata tags.

As discussed, the multimedia content may include a plurality of categories of temporal metadata tags. These categories may be referred to as "attributes" associated with the time code reference of the temporal metadata tags. In other words, in reference to a movie multimedia content, each scene or frame can be associated with a plurality of attributes. In some embodiments, the visual representation 416 may include areas representing all the different attributes identified within a multimedia content.

In various embodiments, users may be able to identify a set of attributes that the user wants to have included within the visual representation 416, and exclude attributes that the user is not interested in seeing visually represented. To allow such user interaction, some embodiments of the visualization mode interface 400 may include an attribute filtering interface 406. As illustrated in FIG. 4, the attribute filtering interface 406 lists attributes identified by temporal metadata tags of the multimedia content that are available to be displayed on the display 412 of the user device 414. By selecting or deselecting particular attributes, a user can customize the visual representation 416 to tailor the user's particular wants. In the illustrated example of FIG. 4, the user has identified the attributes "Action," "Characters," Colors," "Dialogue," "Mood," Props," and "Vehicles" as the attributes of relevance to the user in attribute filtering interface 406. Accordingly, the identified set of attributes may be utilized by a temporal metadata visualization module to create the visual representation 416 to filter out any attributes not selected, such that the visual representation 416 only includes those attributes selected by the user. This provides the user with even greater control over the multimedia content playback experience. The attribute filtering interface 406 may display all the available attributes that a user may select from, based on the types of temporal metadata tags included within the multimedia content. The actual tagging of temporal metadata within a multimedia content, and the identification of different attributes associated with time code references of multimedia content are outside the scope of this disclosure. Once the information has been extracted, however, the attribute filtering interface may provide a listing of all available attributes that the user may select to display.

In some embodiments, users may have the ability to "tag" attributes of the multimedia content. As discussed above, metadata is "data about data." Multimedia content owners and/or providers may identify a list of attributes they believe would be relevant and desired by users, such as the names of actors within a scene, types of vehicles or other objects within a scene, or other types of descriptive information about the multimedia content. By enabling users to "tag" attributes, users may provide an indication of a new type of attribute that the multimedia content owner should identify and provide, or identify the existence of an object related to an already identified attribute that was not previously tagged. Where the user device 414 is connected to a multimedia content distribution system over a network, such as in the environment illustrated in FIG. 1A, the user-defined tags may be sent to the multimedia content distribution system for inclusion with the temporal metadata tags of the multimedia content, such that the next person to playback the multimedia content on another user device may have access to the extra temporal metadata tag. At the same time, the multimedia content owner and/or provider may also update existing metadata tags, remove metadata tags associated with a particular attribute, or include new metadata tags identifying new attributes. For example, where a new attribute is being identified—either based on the user-defined tags or the multimedia content owner's and/or provider's tags—the temporal metadata of the multimedia content may be updated to include additional metadata tags associated with that attribute.

In this way, the user experience may be continuously changed, resulting in a new and unique visualization of the temporal metadata following such updates.

Although described in respect to the example visualization mode interface 400, nothing in this disclosure should be read to limit the scope of the visualization mode interface to only the example shown in FIG. 400. After reading the description herein, it would be apparent to one of ordinary skill in the art that the visualization mode interface in accordance with the disclosed technology can be implemented in any of a number of configurations, and include any combination of different visualization depictions, such as both textual and visual indicator depictions.

As illustrated in FIG. 4, the multimedia content display area 402 is included in the same visualization mode interface 400 as the visual representation 416 and the attribute filtering interface 406. In this way, all of the different components are visible simultaneously, and in distinct areas within the visualization mode interface 400. In some embodiments, different aspects of the visualization mode interface 400 may be overlaid on top of each other.

Figure 5:
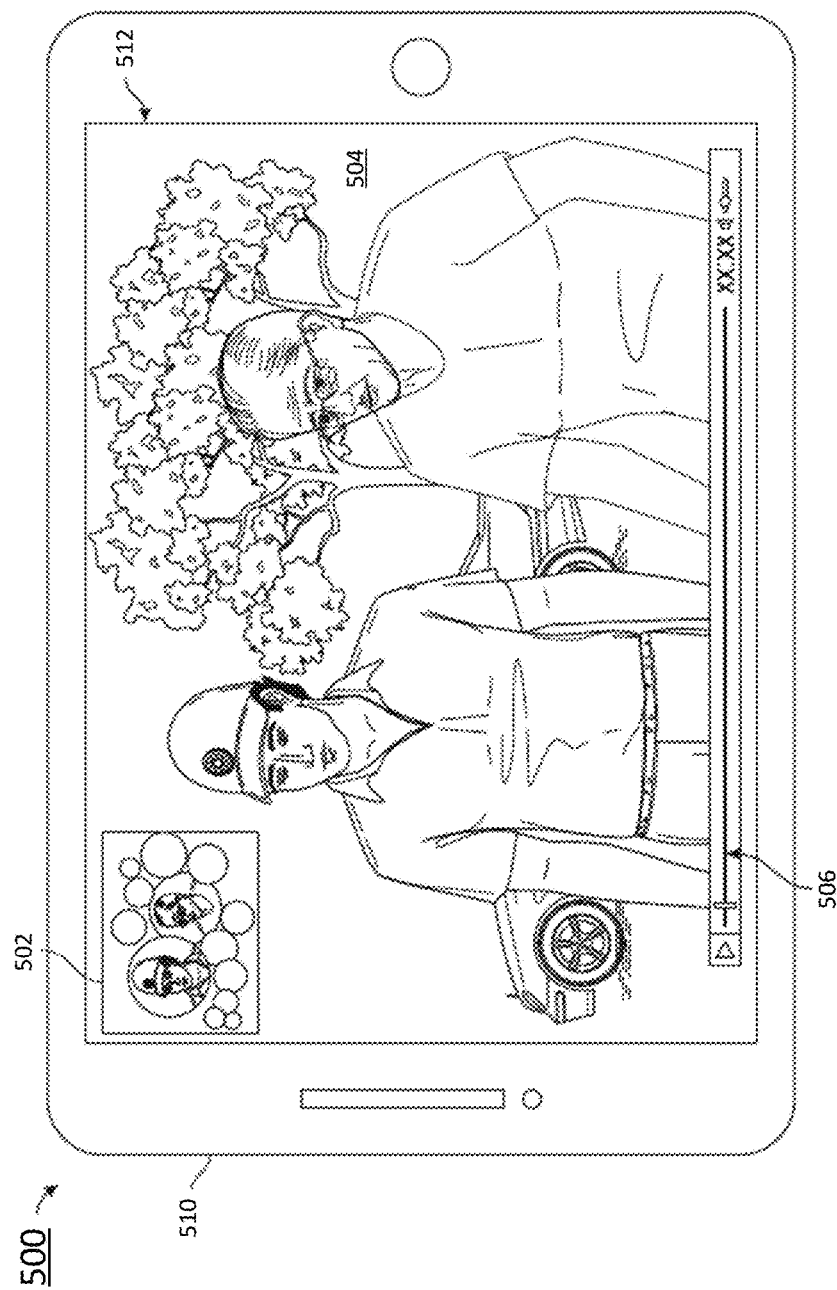
FIG. 5 illustrates a content playback mode interface of a multimedia application running on a user device in accordance with embodiments of the technology described herein.

FIG. 5 illustrates an example multimedia content playback interface 500 in accordance with embodiments of the present disclosure. As illustrated, the multimedia application of the user device 510 is in a playback mode, wherein the multimedia content is being displayed such that it fills the entire viewing area of the display 512. A multimedia content scrubber control 506 may be displayed within the multimedia content playback interface 500, similar to the placement of the multimedia content scrubber control of FIG. 3. Various embodiments may also include an overlay of a visual representation 502, which is displayed on top of the multimedia content 504. As illustrated in FIG. 5, the visual representation 502 includes a visual tag cloud, similar to the visual tag cloud discussed with reference to FIG. 4. In this way, the multimedia content 504 may be displayed in the full viewing area, instead of being formatted to fit within a specific portion of the viewing area of the display 512, as done for embodiments of the visualization mode interface 400 of FIG. 4. This allows the user to enjoy the multimedia content 504 in a larger format, while still providing the temporal metadata visual representation 502 simultaneously.

In some embodiments, the visual representation 502 may also serve the same function as the visualization button discussed with reference to FIG. 3. In such embodiments, a user could click on the visual representation 502, which would open up an interface similar to the visualization mode interface 400 discussed with respect to FIG. 4. A similar function may be provided by clicking on the multimedia content display area 402 of the example visualization mode interface of FIG. 4, wherein a user may click on the multimedia content display area 402, which would open a multimedia content playback interface, similar to the example multimedia content playback interface 500 of FIG. 5.

Figure 6:
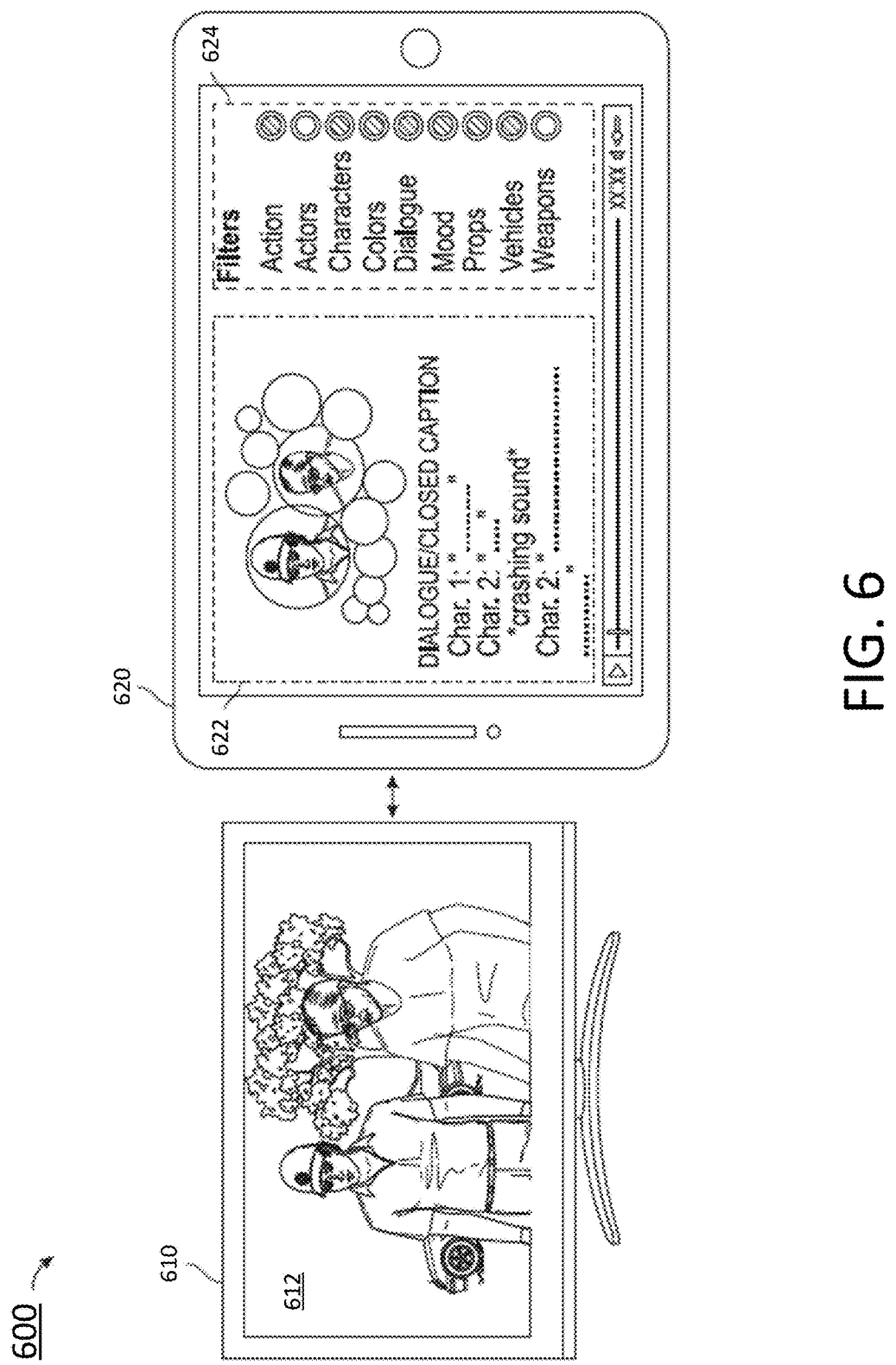
FIG. 6 illustrates another example embodiment showing a dual-screen embodiments in accordance with embodiments of the technology described herein.

Although described with respect to a single screen, the technology of the present disclosure may also be implemented using multiple screens. FIG. 6 illustrates an example dual-screen embodiment 600 in accordance with the technology of the present disclosure. As illustrated, a first user device 610 displays an example multimedia content playback interface, similar to the multimedia playback interface 500 of FIG. 5. On a second user device 620, a visual representation 622 and attribute filtering interface 624, similar to the visual representation 416 and attribute filtering interface 406 of FIG. 4. In some embodiments, the user may be able to toggle the interfaces between the different user devices.

Although the technology has been described mostly with respect to movies, the technology is applicable to any type of multimedia content having temporal metadata tags associated therewith. For example, the same type of visual representation created by the temporal metadata visualization module may be used to allow greater engagement with customers for music. Different attribute categories may be identified for music than for movies (e.g., "Lyrics" instead of "Dialogue"). The same processing steps may be applied, however, to provide a dynamic visual representation of the music multimedia content, increasing the overall experience of the user. Nothing in this disclosure should be read to limit the scope of the technology to only one type of multimedia content.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 7:
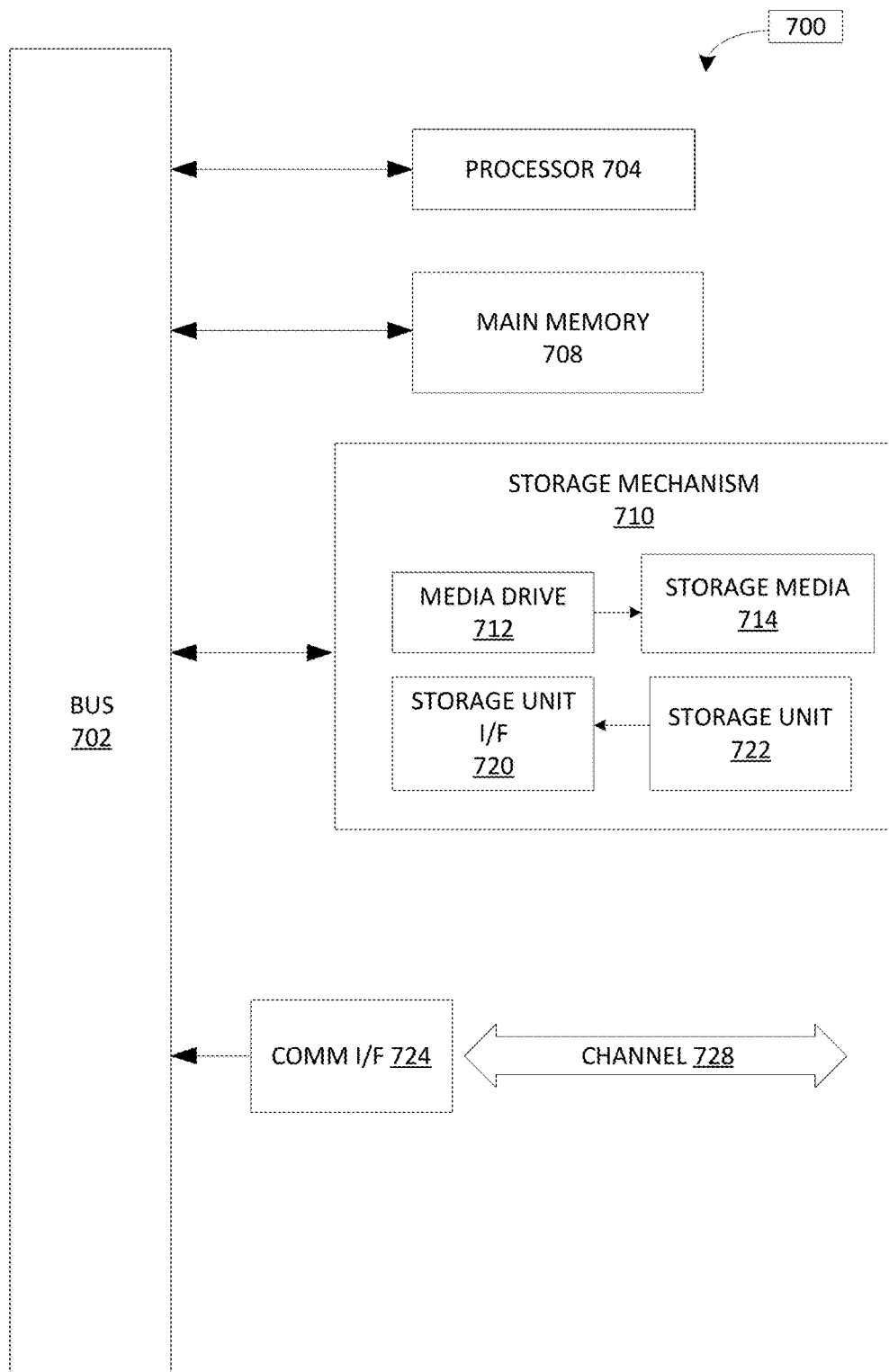
FIG. 7 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example—computing module 700. After reading this description, it will become apparent to a person skilled in the relevant art how to implement the technology using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of visualizing metadata of multimedia content, comprising:
    a temporal metadata visualization module receiving a plurality of temporal metadata tags of a multimedia content, the plurality of temporal metadata tags identifying one or more content attributes of the multimedia content;
    receiving a set of content attribute filters, wherein the set of content attribute filters is based on the one or more content attributes of the multimedia content such that the set of content attribute filters allows a user to select the one or more content attributes;
    receiving user input selecting one or more of the set of content attribute filters;
    creating a visual representation of the one or more filtered content attributes, wherein the filtered content attributes are filtered by a user-selected set of content attribute filters;
    playing the multimedia content;
    displaying the visual representation of the one or more filtered content attributes on a display of the user device, wherein displaying occurs via a multimedia application running on the user device during playback of the multimedia content, wherein the visual representation comprises: a visual tag cloud, wherein individual ones of the one or more filtered content attributes are represented by a respective visual indicator within the visual tag cloud; and
    dynamically changing the respective visual indicator in real time within the visual tag cloud to visually represent the one or more filtered content attributes associated with a current portion of the multimedia content being displayed, wherein the one or more filtered content attributes associated with a current portion of the multimedia content are determined based on a time code reference corresponding to the current portion of the multimedia content.

2. The method of claim 1, wherein the multimedia application comprises the temporal metadata visualization module.

3. The method of claim 2, wherein the user device is communicatively coupled to a multimedia content distribution system, the multimedia content is streamed from the multimedia content distribution system via the multimedia application running on the user device, and receiving the plurality of temporal metadata tags comprises:
    the user device receiving the multimedia content from the multimedia content distribution system, wherein the multimedia content comprises a content portion and a metadata tag portion; and
    the temporal metadata visualization module identifying the metadata tag portion, the metadata tag portion comprising the plurality of temporal metadata tags.

4. The method of claim 2, wherein the one or more filtered content attributes are generated by:
    filtering, by the temporal metadata visualization module, the plurality of temporal metadata tags according to the user-selected set of content attribute filters; and the temporal metadata visualization module creating a visual representation of the one or more filtered content attribute filters.

5. The method of claim 4, wherein filtering the plurality of temporal metadata tags comprises:
the temporal metadata visualization module identifying the user-selected set of content attribute filters via an attribute filtering interface of the multimedia application running on the user device; and
the temporal metadata visualization module applying the user-selected set of content attribute filters to the plurality of temporal metadata tags.

6. The method of claim 4, wherein receiving the plurality of temporal metadata tags comprises:
the multimedia content distribution system retrieving the multimedia content from a content storage location, wherein the multimedia content comprises a content portion and a metadata tag portion; and
the temporal metadata visualization module identifying the metadata tag portion, the metadata tag portion comprising the plurality of temporal metadata tags.

7. The method of claim 1, wherein a multimedia content distribution system comprises the temporal metadata visualization module.

8. The method of claim 7, wherein the one or more filtered content attributes are generated by:
filtering, by the temporal metadata visualization module, the plurality of temporal metadata tags according to the user-selected set of content attribute filters; and
the temporal metadata visualization module creating a visual representation of the one or more filtered content attribute filters.

9. The method of claim 8, wherein filtering the plurality of temporal metadata tags comprises:
the temporal metadata visualization module identifying the user-selected set of content attribute filters via an attribute filtering interface of the multimedia application running on the user device; and
the temporal metadata visualization module applying the user-selected set of content attribute filters to the plurality of temporal metadata tags.

10. The method of claim 1, wherein the visual tag cloud is a mixed indicator-textual tag cloud.

11. The method of claim 10, further comprising the temporal metadata visualization module displaying a multimedia content display area, wherein the visual representation and the multimedia content display area are displayed such that the multimedia content and the visual representation are visible simultaneously.

12. The method of claim 1, wherein the visual representation is overlaid on the multimedia content, such that the multimedia content and the visual representation are visible simultaneously.

13. The method of claim 1, wherein a second user device is communicatively coupled to a first user device, the multimedia content is displayed on a display of the first user device, and displaying the visual representation comprises displaying the visual representation on a display of the second user device.

14. The method of claim 1, wherein the multimedia content comprises one or more of: a movie; a television show; a song; a music album; an animated video; or an audio book.

15. A system for visually representing metadata of multimedia content, comprising:
a user device comprising a display; and
a non-transitory computer-readable medium having instructions stored thereon that, when executed by a processor, cause the system to:
run a multimedia application on the user device, the multimedia application configured to playback a multimedia content having a plurality of temporal metadata tags;
receive a set of content attribute filters, wherein the set of content attribute filters is based on the one or more content attributes of the multimedia content such that the set of content attribute filters allows a user to select the one or more content attributes;
receive user input selecting one or more of the set of content attribute filters;
create a visual representation of the one or more filtered content attributes, wherein the filtered content attributes are filtered by a user-selected set of content attribute filters, wherein the visual representation comprises: a visual tag cloud, wherein individual ones of the one or more filtered content attribute are represented by a respective visual indicator within the visual tag cloud;
display the visual representation on the display of the user device via the multimedia application during playback of the multimedia content; and
dynamically change the visual representation in real time based on a current moment within the multimedia content, wherein the one or more filtered content attributes associated with the current moment of the multimedia content are determined based on a time code reference corresponding to the current moment of the multimedia content; and wherein the respective visual indicator dynamically changes at least one of a size, shape, and location based on at least one of the one or more filtered content attributes associated with the time code reference corresponding to the current moment of the multimedia content.

16. The system of claim 15, wherein the visual representation comprises: a visual tag cloud, wherein the one or more filtered content attributes are represented by a respective visual indicator within the visual tag cloud, and wherein dynamically changing the visual representation comprises dynamically changing the visual indicators within the visual tag cloud.

17. The system of claim 16, wherein the instructions, when executed by the processor, further cause the system to display a multimedia content display area on the display of the user device, wherein the visual representation and the multimedia content display area are displayed such that the multimedia content and the visual representation are visible simultaneously.

18. The system of claim 16, wherein the one or more visual indicators within the visual tag cloud are selectable, wherein the instructions, when executed by the processor, further cause the system: to receive user input selecting one of the visual indicators; and in response to receiving the user input, accessing and displaying additional information about the one or more filtered content attributes represented by the selected visual indicator.

19. The system of claim 15, wherein the visual representation is overlaid on the multimedia content, such that the multimedia content and the visual representation are visible simultaneously.

20. The system of claim 15, wherein the visual representation is displayed immediately when playback of the multimedia content by the multimedia application.

21. The system of claim 15, wherein the multimedia application comprises a user interface accessible by a user of the user device during playback of the multimedia content.

22. The system of claim 21, wherein the user interface comprises a visualization mode button, the visualization mode button configured to initiate a temporal metadata visualization mode, wherein the visual representation is displayed on the display of the user device when the temporal metadata visualization mode is initiated and not displayed when the temporal metadata visualization mode is not initiated.

23. The system of claim 21, wherein the user interface comprises an attribute filtering interface, the attribute filtering interface enabling a user to create the set of content attribute filters.

24. The system of claim 15, the multimedia application further comprising a temporal metadata visualization mode, wherein the visual representation is displayed only when the temporal metadata visualization mode is initiated.

25. The system of claim 24, the user device further comprising an input device, wherein the temporal metadata visualization mode is initiated by an input action of a user.

26. The system of claim 25, wherein the input device comprises a touch screen, and the input action comprises a swipe gesture.

27. The system of claim 25, wherein the input device comprises a mouse, and the input gesture comprises clicking on a visualization viewer button.

28. The method of claim 1, wherein the one or more visual indicators within the visual tag cloud are selectable, wherein the method further comprises: receiving user input selecting one of the visual indicators; and in response to receiving the user input, accessing and displaying additional information about the one or more filtered content attributes represented by the selected visual indicator.

* * * * *